United States Patent [19]
Fieni

[11] 3,854,749
[45] Dec. 17, 1974

[54] SAFETY BELT
[75] Inventor: Walter Fieni, Paris, France
[73] Assignee: Societe Anonyme Francaise Du Ferodo, Paris, France
[22] Filed: Mar. 21, 1973
[21] Appl. No.: 343,572

[30] Foreign Application Priority Data
Dec. 4, 1972  France .............................. 72.43077
Mar. 24, 1972  France ............................. 72.10528

[52] U.S. Cl. .......................... 280/150 SB, 297/388
[51] Int. Cl. ........................................... B60r 21/10
[58] Field of Search ........ 280/150 SB; 297/388, 389

[56] References Cited
UNITED STATES PATENTS
| 3,583,926 | 6/1971 | Lindblad ....................... 280/150 SB |
| 3,779,578 | 12/1973 | Spahl............................. 280/150 SB |
| 3,796,442 | 3/1974 | Maurom........................ 280/150 SB |

Primary Examiner—Robert R. Song
Attorney, Agent, or Firm—Roger Norman Coe; Thomas M. Ferrill, Jr.

[57] ABSTRACT

Safety belt installation designed to enable a vehicle user to accede to and leave his seat easily and to ensure that the user is necessarily wearing his safety belt when he is seated, no catch or buckle being required. The installation further enables integration with a seat independently of the vehicle concerned, hence facilitating construction and fitting on a production line of vehicles with seats provided with safety belts. The installation comprises a safety belt properly speaking, one section of which is fed from a device for reeling and unreeling a strap constituting the belt and is such that the belt is guided by two arms pivotably mounted about an axis located in the upper portion of the seat, so that the belt, which is anchored at its extremities to three fixed points on the seat and/or vehicle, is suitable for being brought from its non-operational position, wherein at least one section extends above the back of the seat, to a state wherein it is applied against the occupant of the seat after pivoting of said guide arms.

9 Claims, 13 Drawing Figures

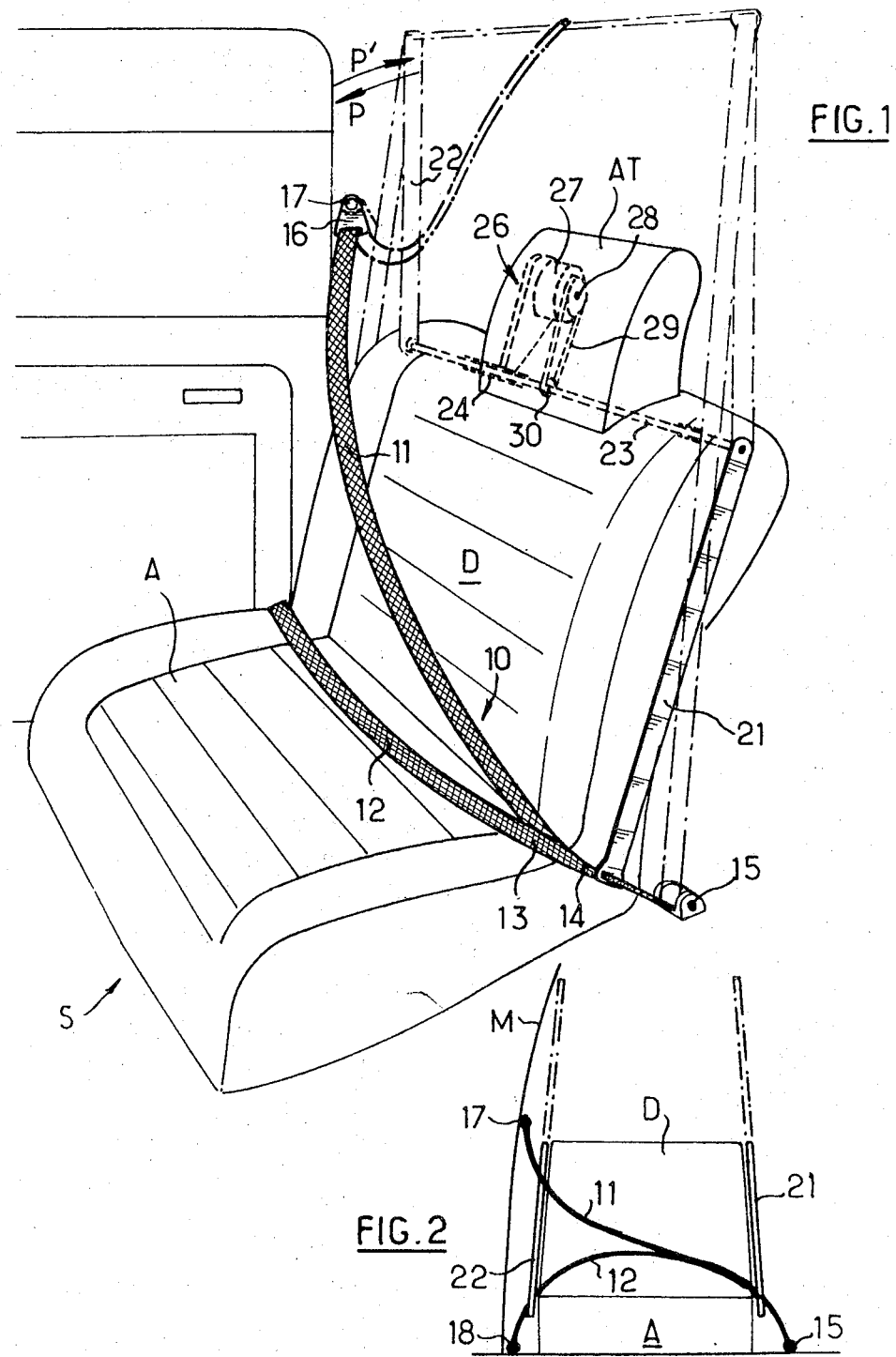

SAFETY BELT

The present invention relates to a safety belt installation, particularly for the occupant of vehicle seat, comprising a safety belt properly speaking, one section of which is fed from a device reeling and unreeling the strap constituting the belt.

Safety belt installations have already been proposed wherein the positioning or application of the belt to the occupant of the seat of the vehicle equipped with the installation is totally independent of any movement on the part of the vehicle user as regards the belt.

In such installations, one problem that has to be resolved is that of organising the installations so as to enable the vehicle user to have access to and to leave a seat easily, particularly without constraint to said user when entering or leaving the vehicle.

In certain known installations, means are provided for separating the sections of the belt from the seat when a user is to reach or leave his seat, while retaining the overall geometry of the safety belt assembly properly speaking, for example a three-point attachment system, said means further ensuring that the belt is applied to the user when he occupies his seat. In these installations, the means for separating the belt from the seat are generally actuated by opening a door adjacent to the seat so that, when the door is partially prevented from opening, the occupant of the seat may have some difficulty in leaving the vehicle.

It is generally a purpose of the invention to provide a safety belt installation that is free of the constraints imposed on known installations.

It is also a purpose of the invention to provide such an installation that functions reliably and automatically, ensuring that the occupant of the vehicle seat is necessarily provided with his safety belt when he is sitting on the seat, while it is not required to equip the belt with a buckle.

It is a further object of the invention to provide such an installation whose constitution enables integration with a seat, independently of the vehicle the seat is to equip, and which thus facilitates construction and fitting, on a production line, of vehicles with seats provided with safety belts.

The safety belt installation according to the invention is characterized in that the belt is guided by two arms pivotably mounted about an axis located on the upper portion of the seat, so that the belt which is anchored at its extremities to three fixed points of the seat and/or vehicle is suitable for being brought from its non-operational position wherein at least one section of the belt extends above the back of the seat to a position wherein it bears against the seat occupant after said guide arms have pivoted.

In order to facilitate both the positioning of the belt on the user when he occupies his seat and the release of said belt when he wishes to leave his seat, it is desirable for the guide arms of the strap to be as long as possible. Now, the height of the vehicle roof, particularly of a car, is generally limited; consequently the invention additionally provides for the guide arms to be constructed of at least two inter-articulating sections.

The invention will be fully understood by virtue of the following description given for the purposes of example and with reference to the attached drawings wherein:

FIG. 1 is a perspective diagram of a safety belt installation according to the invention;

FIG. 2 is an elevation diagram;

Figure 3:
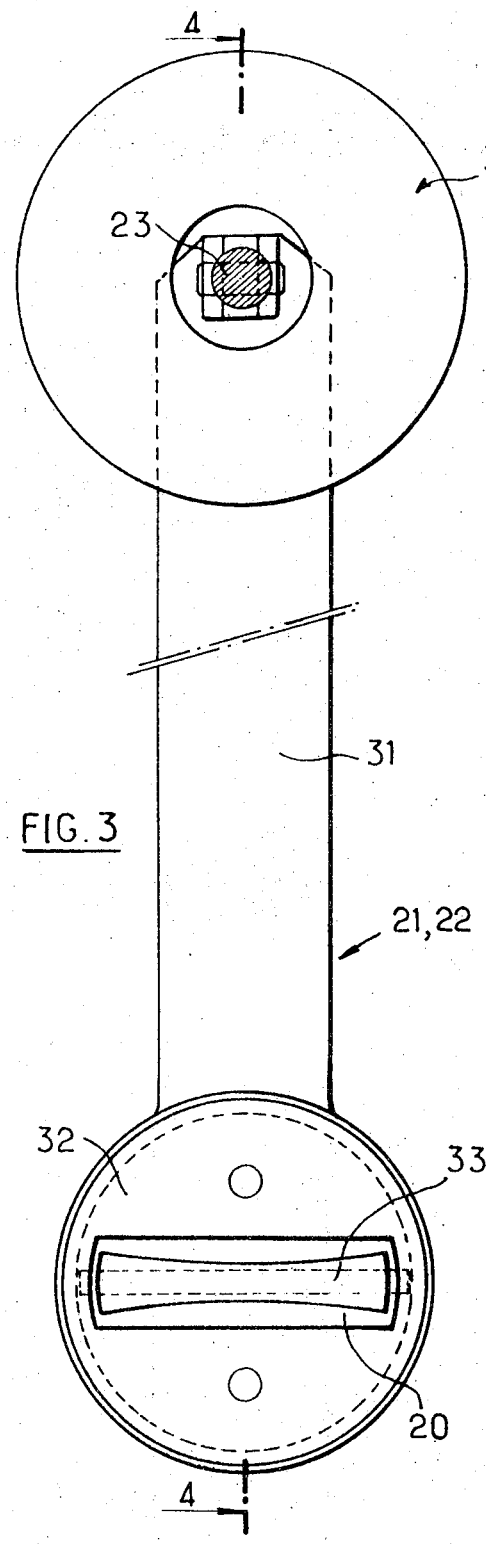
FIG. 3 is a top view of an arm forming part of an installation according to the invention.

The safety belt installation according to the invention for the occupant of a vehicle seat S, particularly an automobile vehicle, comprises a safety belt properly speaking 10, (FIGS. 1 and 2), with a cross belt section 11, a sub-abdominal section 12 attached at 13 to the cross-belt section and a common section 14 fed from a reel device 15 attached to the vehicle to which the seat S is fitted or to the seat itself which comprises a bearing surface A, a back D and, advantageously, a head-rest AT. The extremity of cross-belt 11, remote from its zone 13 of attachment to the common section 14, is attached to the vehicle by a shackle 16 pivotably mounted about a pin 17, and the extremity of the sub-abdominal section 12, remote from the zone 13 of attachment to the common section 14, is attached to an anchor point 18 of the vehicle or the seat properly speaking.

A belt opening buckle, not represented, can be provided if necessary.

The reel device 15 is either of the automatic locking type, i.e., preventing any traction of the strap constituting the belt sections as soon as the belt is positioned on the occupant of seat S, or of the type that locks if the vehicle sustains an impact.

Figure 4:
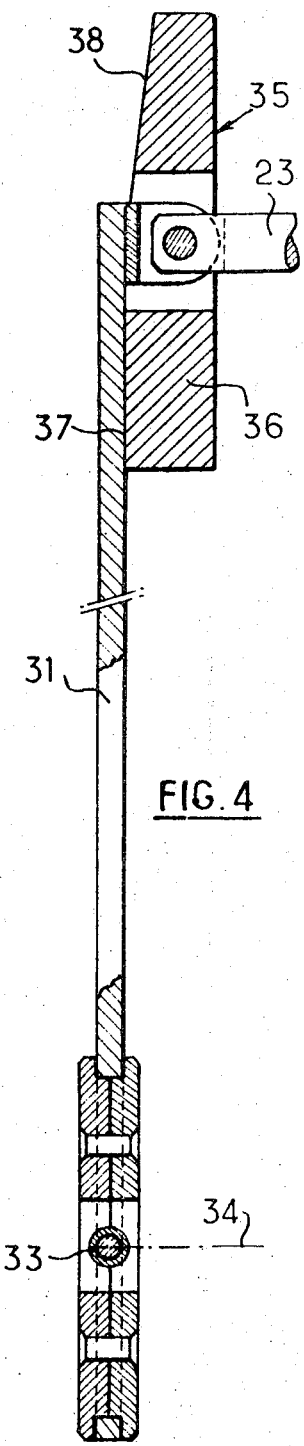
FIG. 4 is a cross-section view along line 4—4 of FIG. 3.

According to the invention, arms 21 and 22 are attached respectively to common section 14 and sub-abdominal section 12; each arm comprises a slot 20, (FIGS. 3 and 4), through which the section constituting strap passes, the arms extending substantially parallel to the lateral edges of back D of seat S and both being pivotably mounted about a shaft 23. The latter, which is housed in the upper portion of back D, is supported by bearings diagrammatically represented at 24 and 25 and is suitable for being rotated by motor means 26 which, in the form of embodiment represented, are provided in the head rest AT and comprise a motor 27 with an output shaft carrying a toothed wheel or gear 28 with which cooperates a belt 29 driving a pulley or similar means 30 rotatably integral with shaft 23.

Each one of arms 21, 22 is constituted by an arm 31 properly speaking, (FIGS. 3 and 4), generally rectangular in shape, one extremity of which bears a disc 32 comprising window 20 longitudinally crossed by an idle mounted roller 33 which is capable of rotating about pin 34 passing through its centre and perpendicular to its plane.

At its extremity opposite that bearing disc 32, each arm 31 properly speaking cooperates with a cam 35, integral with the back of the seat which provides, on its portion 36 nearest to the vehicle flooring, a bearing surface 37 more remote from the axis of the longitudinal median plane of seat S than bearing surface 38, which is inclined in order to take into account, on one hand, the generally trapezoidal shape of backs D, (FIG. 2), and also the curved shape, on their upper portions, of the uprights M of the vehicle fitted with the installation. As arms 21 and 22 are constantly biased together by the tension of the belt constituting strap, cams 35 associated with the two arms cause said arms, when they are in the top position, represented by a dot and dash line in FIGS. 1 and 2, to be substantially in the projection line of the lateral edges of the seat back, instead of separating therefrom as they would if said cams were not present.

Figure 5:
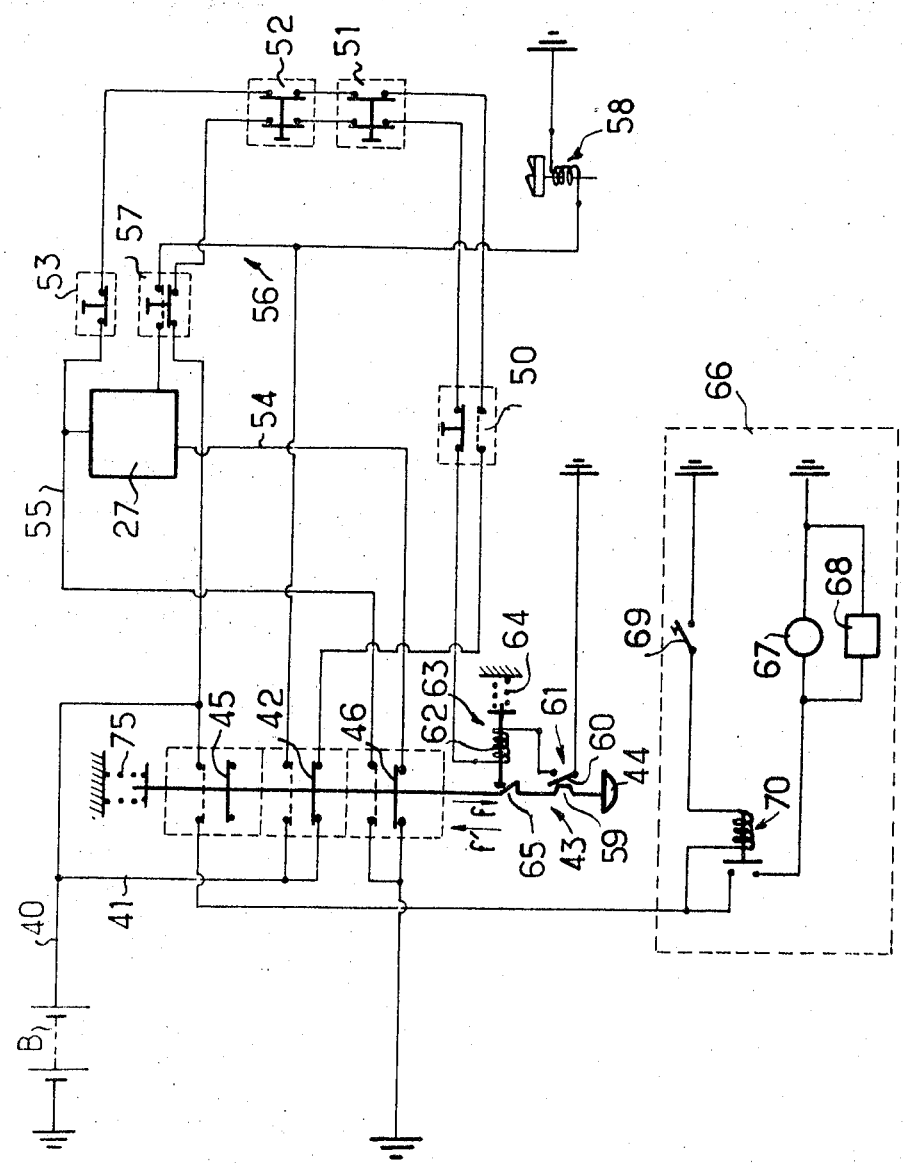
FIGS. 5 and 6 are wiring diagrams.

In order to actuate an installation according to the invention fitted to a single seat of the vehicle, the electric circuit of motor 27 is as represented in FIG. 5. It comprises, starting with the battery B of the vehicle, a power supply circuit for motor 27 which causes said motor to rotate at a low speed in the direction corresponding to the pivoting movement of arms 21 and 22 in the direction of arrow p (FIG. 1), and which is constuted by a conductor 40 one branch 41 of which may be opened by the mobile blade 42 of a switch 43 comprising push-button 44, as well as by the mobile blade of a switch 50 housed in the bearing surface A of the seat. This circuit also comprises switches 51 and 52 corresponding to each of the doors of the vehicle, for example the two front doors, and a switch 53 actuated at the end of the downward movement of arms 21 and 22, return to earth (ground) being provided by one or other of conductors 54 and 55 whose continuity may be broken by the same mobile strip 46 of switch 43, which additionally comprises a third mobile strip 45.

The latter together with strip 42, also serves to control power supply to motor 27 for driving the latter at high speed in a rotation direction opposite the low speed movement, by a circuit 56 in which is inserted a switch 57 sensing the end of the upward stroke of arms 24 and 22, by pivoting about pin 23 in the direction of arrow p', starting from the position represented by a continuous line in FIG. 1.

For safety reasons, unlocking means are also provided for the reel 15 as represented by the coil 58 interposed between the ground and the battery in a circuit suitable for being opened and/or closed by means of strip 42 of switch 43.

This switch is shaped to provide a cam 59 suitable for cooperating with the mobile member 60 of a switch 61 connected to winding 62 of an electro-magnet 63 upon whose armature acts a compression spring 64 biasing the extremity of said armature to project over the path of a stop means 65 of switch 43, itself biased to move in the direction of arrow f by a compression spring 75.

The installation also comprises a safety and alarm device 66 with an indicator lamp 67, audible indicator 68 and gear box contact 69 inserted in the circuit of a relay 70 to energize lamp 67 and audible indicator 68, when switch 43 is made operative and as long as the gear box is not at dead center.

An installation according to the invention functions as follows:

In the initial position represented by a dot and dash line in FIG. 1, arms 21 and 22 are in top position and at least a portion of common section 14, fed from reel 15 and comprised between said arms, is above the back D of the seat S. In this initial position, the electrical control installation is as represented by a continuous line in FIG. 5, the doors of the vehicle being closed, the gear box being at dead center and seat S not being occupied.

When the user is seated the mobile member of switch 50 is brought to the position represented by the dotted line in FIG. 5. As the arms are in top position, the mobile contact of switch 57 is in the position represented by the unbroken line and the mobile blades of switch 44 being also in the position represented by the unbroken line, owing to the bias of spring 75 on switch 43, there is a flow of current between the battery and ground through conductor 40, conductor 41, strip 42, switch 50, switches 51 and 52, as the doors are closed, switch 53, as the arms are in top position, motor 27 and conductor 54. Motor 27 is driven in rotation at a low speed in the direction causing arms 21 and 22 to pivot in the direction of arrow p, so that the belt is progressively applied against the body of the user.

When the position of arms 21 and 22 represented by an unbroken line in FIG. 1 is reached, said arms, or one of them, actuate switch 53 which cuts off current flow to motor 27. The reel 15 is locked or may be locked, in the event of impact, so that the occupant of the seat is maintained by the safety belt which prevents his body from being displaced forwards, avoiding any projection against the windscreen and/or the dashboard in the event of the vehicle sustaining an impact while travelling.

At a standstill, when the occupant wishes to leave the vehicle, he depresses switch 43 to displace it in the direction of arrow f' until the stop means 65 passes the projection of the armature of electromagnet 63, which is then non-energized owing to the state of switch 50 whose mobile member is maintained in the position represented by a dotted line in FIG. 5 by the weight of the user on the seat, this despite the fact that cam 59 has displaced the mobile member 60 of switch 61 to connect coil 62 of electro-magnet 63 to earth (ground). The mobile strips of switch 43 are in the position represented by a dotted line in FIG. 5 and there is then a current flow from the battery B to mass through conductor 40, conductor 41, strip 42, circuit 56, switch 57 whose mobile blade is then in the position represented by dotted lines, the motor 27, conductor 55 and strip 46. The motor 27 is rotated at high speed in the direction causing arms 21 and 22 to pivot in the direction of arrow p', so that the belt is separated from the body of the occupant, the increase in length of the belt being made possible by the action of the reel 15 from which issues common section 14. The pivoting mounting of discs 32 on arms 21 and 22 enables the strap to be variably orientated in relation to said arms, thus preventing said strap, whose movement is further facilitated by the presence of idle rollers 33, from jamming, twisting or being incorrectly placed.

When the position represented by the dot and dash line in FIG. 1, is reached, switch 57 is actuated to interrupt current flow to the motor 27, while switch 53 returns to its position as represented in FIG. 5: the seat occupant is completely released from his belt and, after he leaves his seat and as the doors are closed again, the mobile member of switch 50, brought back to the position represented by an unbroken line in FIG. 5, allows current to flow through the coil 62 of electro-magnet 63, releasing the armature of said electro-magnet which frees the stop member 65 and causes switch 43 to be rearmed by spring 75.

The installation remains in the state which has just been reached, so that the user may again immediately return to his seat in order, when he sits on it, to ensure that the safety belt is once more applied against his body, as previously described, without his having to manipulate the belt in any way.

Figure 6:
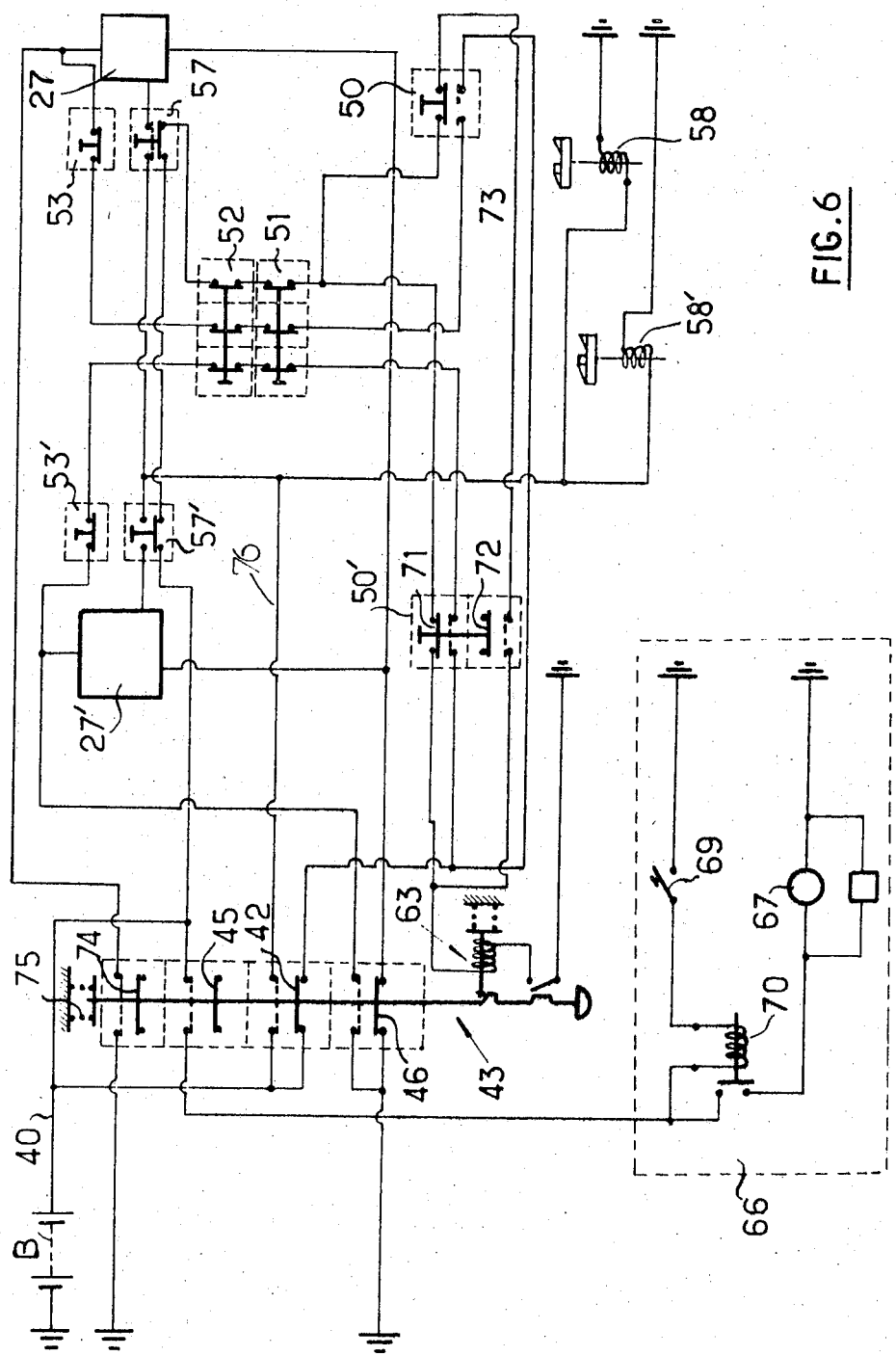

In an embodiment provided for equipping two seats of a vehicle, the control means are organized as represented in FIG. 6, wherein the parts identical to those of the circuit according to FIG. 5 bear the same reference numbers as said figure, for one of the seats and the same reference numbers plus " ' " for the corresponding parts of the other seat.

In such an installation, besides motor 27 and its control means all, connected to the passenger seat, a motor 27' is provided for controlling the movement of arms such as 21 and 22 connected to a safety belt equiping the driver's seat, the supply circuits of motor 27' being almost identical to those of motor 27, except that the seat switch 50' comprises two mobile blades 71 and 72 the first of which performs the same functions as switch 50 in the previous form of embodiment and the second of which is provided for opening and/or closing a circuit 73 into which is inserted seat switch 50 connected to motor 27, supply for which is controlled by a mobile blade 74 of switch 43.

In this embodiment, whose operation is analogous to that of the previously described embodiment, switch 43 controls, through conductor 76, the simultaneous rotation of motors 27 and 27' in the same direction for rapid pivoting, in the direction of arrow p', of arms 21 and 22 corresponding to each of the seats, i.e., to release both occupants simultaneously from the two adjacent seats of the vehicle to which the installation is fitted. However, control of the movement of motors 27 and 27' at a low speed, in the rotation direction pivoting arms 21 and 22 in the direction of arrow p' is independent, so that when a seat is occupied, the belt of the other seat is in its nonoperational state to enable its user to enter the vehicle and, when he sits on the seat, to operate the belt fitted to said seat so that it is positioned on his body.

In this embodiment, also, the unlocking means of reels 58 and 58' connected respectively to reel device 15 and to the reel device for the belt of another seat, are shunted on conductor 76, so as to be actuated independently.

With reference now to FIGS. 7 to 10, referring to another embodiment, the installation according to the invention comprises a safety belt properly speaking 110, (FIG. 7), a cross belt 111, sub-abdominal section 112 attached at an anchor point of the vehicle properly speaking or the seat, and a common section 114 issuing from a reel device 115. The extremity across belt 111, remote from its zone of attachment to the common section 114 by means of a ring 113 through which the single strap constituting sections 111 and 112 slides, is attached to the upright of the vehicle adjacent to door P by a ring or shackle 116 pivoting about a pin 117.

Arms 121 and 122 are harnessed respectively to common section 114 and sub-abdominal section 112; these arms extend substantially parallel to the lateral edges of back D of seat S and are both integral in rotation with a shaft 123. The latter, which is housed in the upper portion of back D, is suitable for being rotated by motor means 126 which, in the form of embodiment represented, comprise a motor 127 whose movement is transmitted to shaft 123 by means of toothed wheels 128 and 129.

Figure 9:
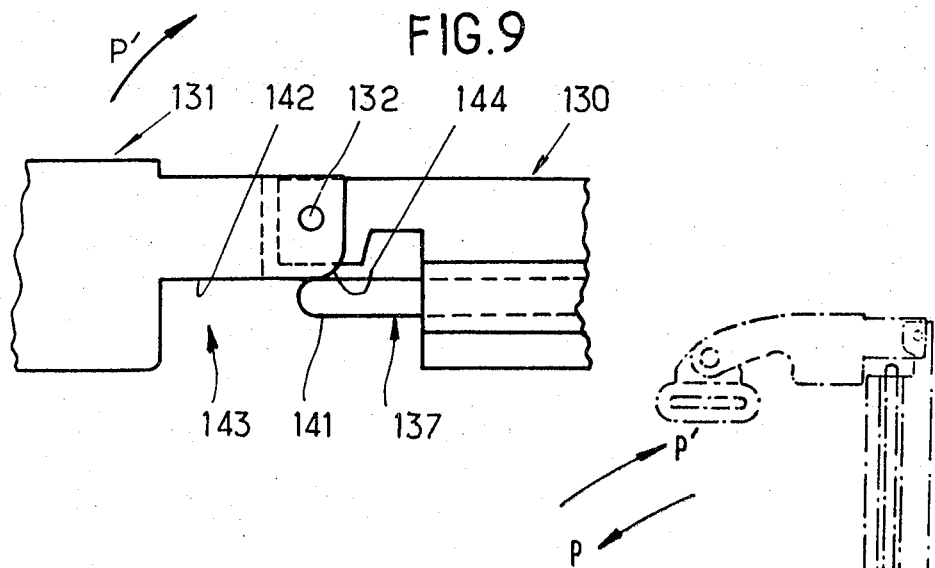
FIG. 9 is a larger scale view of the articulation portion of the two sections of the arm represented in FIG. 8.
Figure 8:
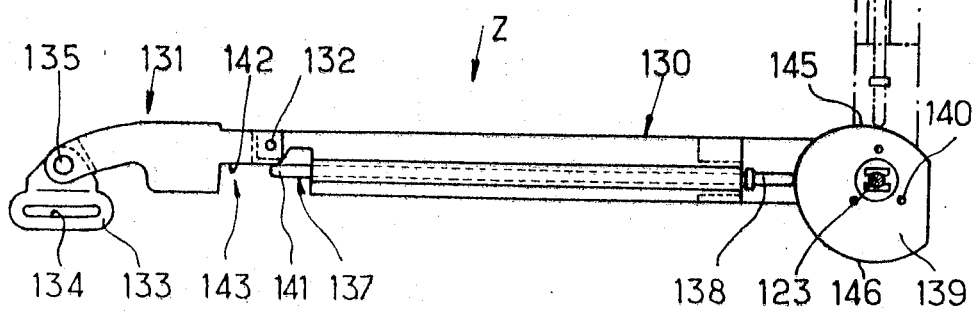
FIG. 8 is an elevation view of an arm of the installation according to FIG. 7 in two different positions.
Figure 10:
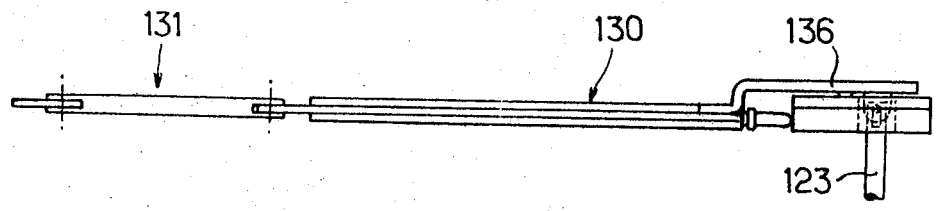
FIG. 10 is a view of the arm represented in FIG. 8, in the direction of arrow Z in this figure.

As represented in FIGS. 8 to 10, each of arms 121, 122 is articulated to form two sections the longer one of which, 130, is integral in rotation with shaft 123 and the shorter one of which 131, is pivotably mounted on the first about a pin 132. At its extremity opposite that pivoting on section 130, section 131 bears a slide member 133 articulated about a pin 135 and whose window 134, crossed by the strap constituting the belt, is advantageously so dimensioned that it cannot allow through ring 113.

Portion 130 of each arm 121, 122 integral in rotation with shaft 123 by means of a double bracket member 136, houses a cam follower 137 whose extremity nearest to shaft 123 is shaped to form a finger 138 for following the periphery of a cam 139 attached to back D by means diagramatically represented at 140, the extremity 141 of the cam follower opposite the finger 138 being suitable for operation with the adjacent extremity of section 131 which, in the vicinity of its articulation on section 130, comprises a step 143 whose edge 142 is extended by a rounded member 144 in its contact zone with extremity 141 of cam follower 137.

The cooperation of extremity 141 of the latter with edge 142 of step 143 ensures that the two arm portions are relatively blocked when the arms are most extended, rounded profile 144 extending edge 142 nonetheless enabling portion 131 to rotate in relation to portion 130 in the direction of arrow p' (FIG. 9).

Figure 7:
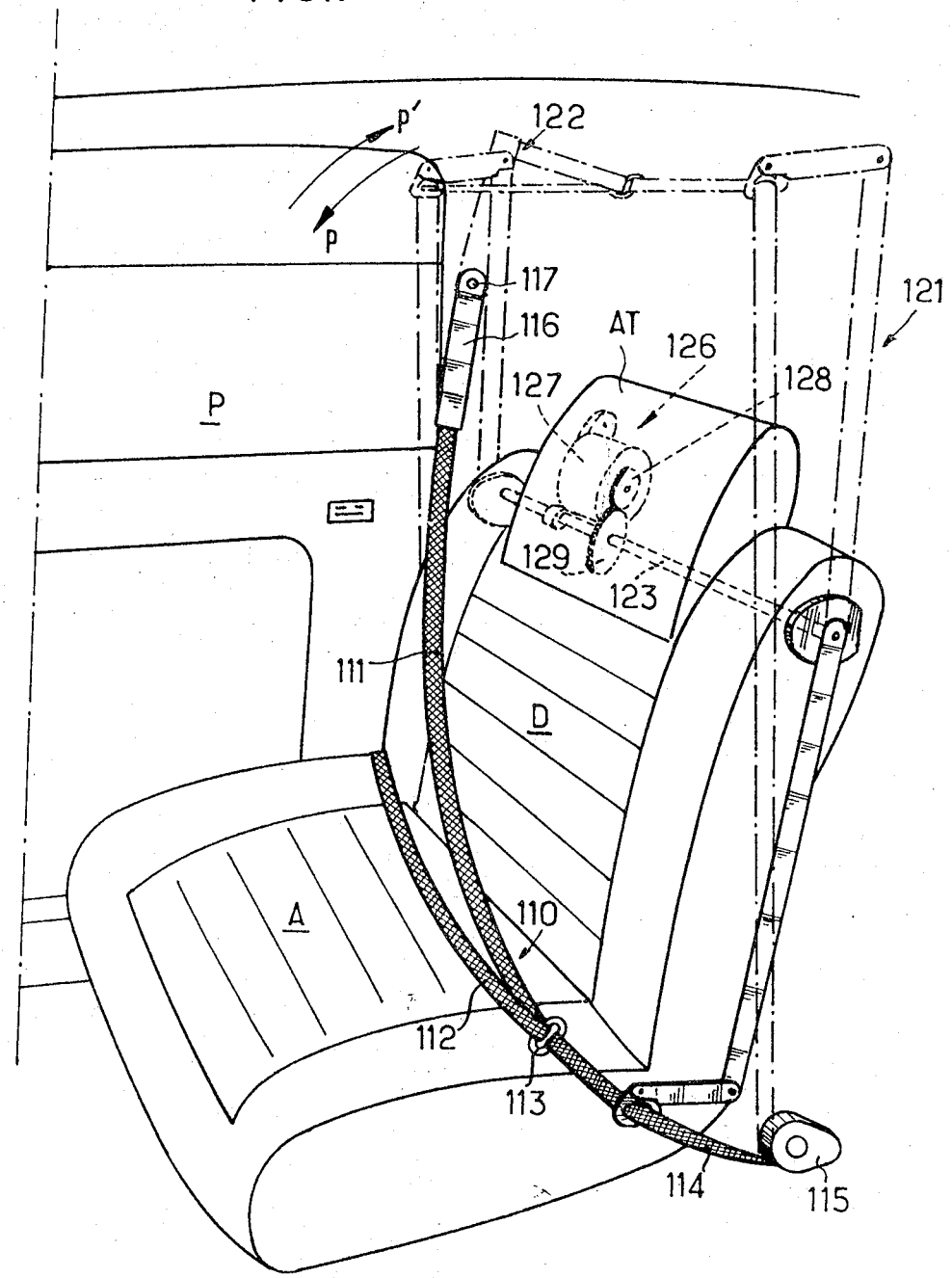
FIG. 7 is a perspective diagram of another embodiment of an installation according to the invention.

When the belt is in its operative position, both the belt and the arms 121 and 122 are as represented by the dot and dash line in FIGS. 7 and 8: at least one portion of common section 114 issuing from the reel 115, one portion of cross-belt 111 and of subabdominal section 112, together with ring 113 are above the back D of seat S; the sections 131 of arms 121 and 122 are substantially at right angles in relation to sections 130 and are maintained in this position by the force applied thereto, under the effect of the reel device 115, by the belt constituting strap; the finger 138 of cam follower 137 cooperates with a portion 145 of the periphery of cam 139 adjacent to the axis of shaft 123.

When the user has seated, automatically controlled electro-mechanical means in the door or the seat, etc., or again manual control means, not represented, trigger the rotation of motor 127. The latter is driven in rotation in the direction causing arms 121 and 122 to pivot in the direction of arrow p and, during this pivoting after a distance of several degrees, the cam follower 137, displaced by cam 139, extends section 131 in relation to section 130, by the cooperation of extremity 141 of edge 142 of step 143 until the arms have reached their greatest dimension. This position, which is obtained by locking the extremities 141 of the cam follower 137 on the edge 142 of step 143, is maintained by means of the tension of the strap which holds the cam follower in locking position.

As ring 113 cannot pass through opening 134 the cross-belt section 111 can always be substantially in a suitable position when the belt becomes operative and presses against the user, ring 113 always moving, during the arm manoeuvre, on the same side of the vertical median plane of seat S.

When the pivoting movement is completed, section 131 of each of arms 121, 122 if folded by slewing about pin 132, in the direction of arrow p' (FIG. 9); each of the arms assumes its shortest length position, extending substantially parallel to back D, in the case of section 130, and to bearing surface A of the seat, in the case of section 131. The position of arms 121 and 122 is as represented by the continuous line in FIG. 7, i.e., that wherein the sections 131 are again substantially at right angles to section 130.

At a standstill, when the occupant of the seat provided with the installation wishes to leave the vehicle, the actuation of means, not represented, causes motor 127 to rotate in the direction causing arms 121 and 122 to pivot in the direction of arrow p', advantageously at a greater speed than for making the belt operative and, during this pivoting phase, arms 121 and 122 first resume their greatest length position wherein they are momentarily maintained by the action of cam follower 137 and then, at the end of travel, again resume their folded position as a result of the force applied by the strap issuing from the reel when, during the arm rotation phase, the cam follower 137 retreats.

Figure 11:
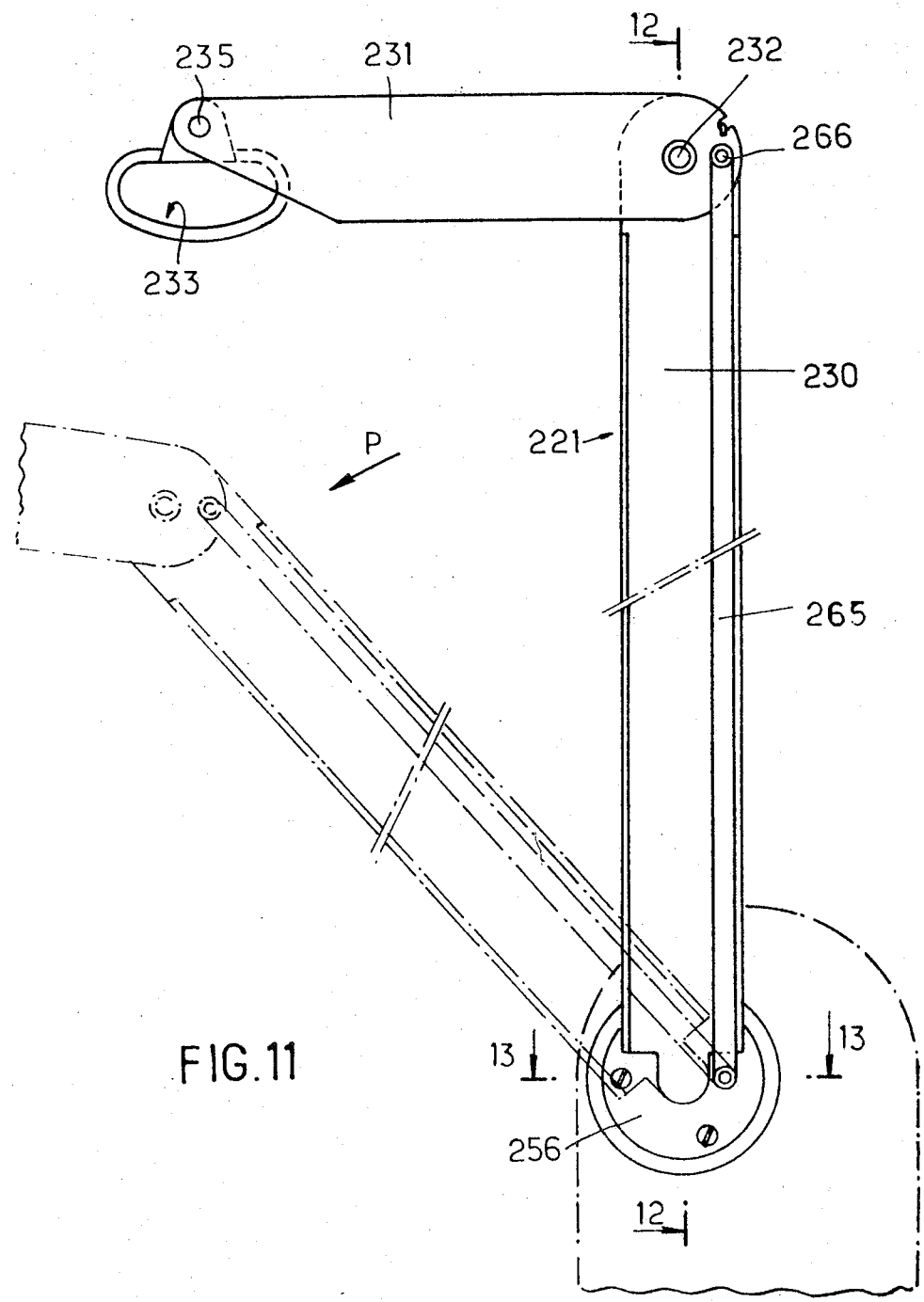
FIG. 11 is a view analogous to that of FIG. 8, but for another embodiment.
Figure 12:
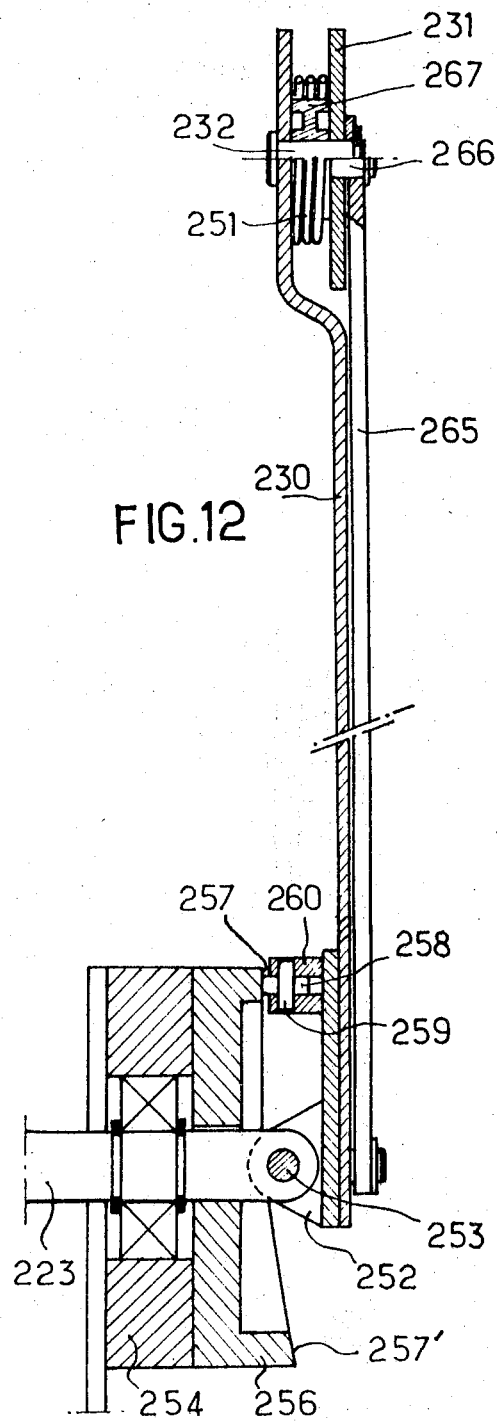
FIG. 12 is a cross-section view along line 12—12 of FIG. 11.
Figure 13:
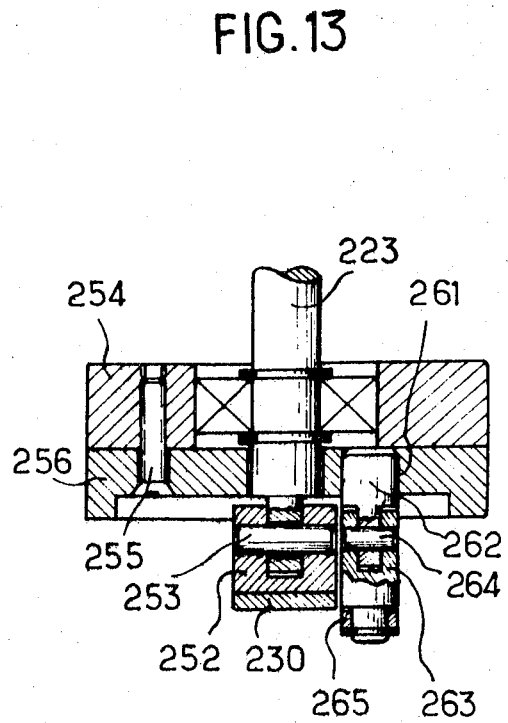
FIG. 13 is a cross-section view along line 13—13 of FIG. 11.

FIGS. 11 to 13 represent another form of embodiment of an installation according to the invention.

In the latter, each one of arms 221, 222 is constituted by two sections 230 and 231 mounted in rotation upon one another about an axis 232, the second of them carrying, on its extremity remote from axis 232, a slide member 233 articulated about a pin 235. The extremity of section 230 remote from axis 232 is made integral by a yoke 252 with a pin 253 of a shaft 223 mounted in a bearing 254 and suitable for being rotated by a motor means, not represented. A cam 256 is attached by means of screws such as 255 (FIG. 13), to the cage of bearing 254; the track 257 cam 256 engages with a roller 258 maintained by a pin 259 in a yoke 260 integral with section 230 and which slightly separates the sections such as 230 from arms 221 and 222 of back D of seat S, in the position wherein roller 258 cooperates with portion 257', (FIG. 12), of cam 257 track.

In a bore 261 of cam 256 is housed an articulation pin 262 of a yoke 263 with a pin 264 to which is attached one extremity of a rod 265 whose other extremity is articulated about a pin 266 on section 231 of arm 221. A torsion coil spring 251 surrounding a spacer member 267 fitted over pin 232 between sections 230 and 231 has its extremities attached to these two sections respectively. This spring, whose force is greater than that of the reel device return means, is armed in the nonoperational position of the installation and, when arms 221, 222 actuated by shaft 223 pivot in the direction of arrow p to bring the belt into operational condition, it facilitates the unfolding of the arms positively actuated by rod 265 to bring them to their greatest length position.

Near the end of the arm pivoting phase making the belt operational; the action of spring 251, which biases section 231 of arm 221 upwards, causes section 231 to begin to fold in relation to section 230 finally reaching the position of the arms as represented by an unbroken line in FIG. 7.

During the arm raising movement, spring 251 is again tensed by the rotation of shaft 223 in the direction opposite to that previously taken.

The embodiment in FIGS. 11 to 13 not only enables the installation to be directly controlled all the time the arms are moving but also enables the arms to begin to fold when their articulation points are aligned.

I claim:

1. Three point safety belt installation particularly for an occupant of a vehicle having a floor and a seat with a seat back, comprising a seat belt, either end thereof being fixedly anchored to respective one of two vertically spaced structural portions of the vehicle on one side of the seat, a common strap, one end thereof being secured to an intermediate portion of said seat belt and the other end thereof being connected to a belt retractor secured to the floor on the other side of the seat, a transverse shaft rotatably mounted in an upper portion of the seat back, a pair of arms movable from a first position wherein said seat belt engages the occupant of the vehicle to a second position wherein said seat belt is removed from the occupant for easy ingress and egress to and from the seat, each of said arms being non-rotatably connected at one end thereof to a respective end of said shaft and having an aperture provided at the other thereof, each said aperture slidably engaging respective one of said common strap and said seat belt, actuating means operatively connected to said shaft for rotating said arms between said first and second position.

2. Safety belt installation according to claim 1, wherein each guide arm comprises at least two inter-articulated sections.

3. Safety belt installation according to claim 2, wherein the relative movement of the inter-articulated sections is actuated by camming means.

4. Safety belt installation according to claim 3, wherein one extremity of a cam follower housed in the inter-articulated section rotatably integral with said shaft cooperates with the camming means which is fixed, the other extremity of the cam follower abutting with the other inter-articulated section.

5. Safety belt installation according to claim 3, wherein the camming means cause the guide arms to adopt their shortest length position when the belt is in said second position, and cause said guide arms to assume their greatest length position during their pivoting movement which brings the belt from second position to said first position.

6. Safety belt installation according to claim 5, wherein when the belt is in said first position, the guide arms are also in their shortest length position, one of the inter-articulated sections extending substantially parallel to the lateral edges of the back of the vehicle seat and the other inter-articulated section substantially parallel to the bearing surface of the vehicle seat.

7. Safety belt installation according to claim 2, wherein the inter-articulated sections are relatively displaced by rod means, elastic torsion means being provided between the inter-articulated sections of each guide arm.

8. Installation according to claim 7, wherein said elastic torsion means are constituted by a coil spring attached to each of the sections of the arm and housed about a spacer means disposed between the two sections and which surrounds their articulation pin, said coil spring whose force is greater than said second of the reel return means being armed in the state wherein the arms maintain the belt in non-operational position.

9. Safety belt installation according to claim 7, wherein the rod means connected to each of the guide arms is articulated at one extremity to a fixed support integral with the means for mounting the guide arm on the vehicle seat and at its other extremity articulated on the section of the guide arm which is not rotatably integral with the pivoting control shaft controlling pivoting of said guide arm.

* * * * *